United States Patent
Hamamura

(10) Patent No.: US 8,565,209 B2
(45) Date of Patent: Oct. 22, 2013

(54) COMMUNICATION APPARATUS, COMMUNICATION SYSTEM, COMMUNICATION METHOD AND COMPUTER-READABLE STORAGE MEDIUM

(75) Inventor: Masanori Hamamura, Kochi (JP)

(73) Assignee: Kochi University of Technology, Kochi (JP)

( * ) Notice: Subject to any disclaimer, the term of this patent is extended or adjusted under 35 U.S.C. 154(b) by 0 days.

(21) Appl. No.: 13/321,936

(22) PCT Filed: Sep. 9, 2011

(86) PCT No.: PCT/JP2011/005105
§ 371 (c)(1),
(2), (4) Date: Nov. 22, 2011

(65) Prior Publication Data
US 2013/0064238 A1 Mar. 14, 2013

(51) Int. Cl.
*H04B 7/216* (2006.01)

(52) U.S. Cl.
USPC ............................ 370/342; 375/141; 375/143

(58) Field of Classification Search
USPC .......... 370/310, 342, 343, 345; 375/130, 140, 375/141, 142, 143, 144, 145, 146, 147, 148, 375/149, 152; 700/1, 28, 53
See application file for complete search history.

(56) References Cited

U.S. PATENT DOCUMENTS

| | | | |
|---|---|---|---|
| 6,580,748 B1 | 6/2003 | Muraoka | |
| 6,937,558 B2 | 8/2005 | Wakutsu | |
| 7,206,606 B2 * | 4/2007 | Kobayashi et al. | 455/562.1 |
| 7,450,658 B2 * | 11/2008 | Tsai et al. | 375/267 |
| 7,508,880 B2 * | 3/2009 | Yun et al. | 375/267 |
| 7,620,099 B2 | 11/2009 | Hahm et al. | |
| 7,782,970 B2 * | 8/2010 | Shao et al. | 375/267 |
| 2010/0183048 A1 * | 7/2010 | Hamamura et al. | 375/130 |

FOREIGN PATENT DOCUMENTS

| | | |
|---|---|---|
| JP | 9298495 A | 11/1997 |
| JP | 2003-018127 | 1/2003 |
| JP | 2003032220 A | 1/2003 |
| JP | 2006148220 A | 6/2006 |
| WO | 2005050863 A1 | 6/2005 |
| WO | WO 2005050863 A1 * | 6/2005 |

OTHER PUBLICATIONS

International Search Report mailed on Oct. 4, 2011.
Jan Mietzner et al., "Multiple-Antenna Techniques for Wireless Communications—A Comprehensive Literature Survey", IEEE Communications Surveys & Tutorials, vol. 11, No. 2, Second Quarter 2009.

(Continued)

*Primary Examiner* — Chi Pham
*Assistant Examiner* — Weibin Huang
(74) *Attorney, Agent, or Firm* — IPUSA, PLLC

(57) ABSTRACT

In a communication system adapted to MIMO transmission, a receiver may include a filter to filter signals received from a transmitter through the receiver antennas and having a weight matrix thereof updated by an adaptive algorithm with respect to each substream message symbol from the transmitter, and a code generator to feed back a part of the weight matrix updated by the filter, as an updated STF code, to the transmitter. The transmitter may make the transmission using the updated STF code which is optimized for a current channel state.

20 Claims, 10 Drawing Sheets

(56) References Cited

OTHER PUBLICATIONS

Kevin H. Lin et al., "Performance of STF Coded OFDM with Transmit Eigenbeamforming in Correlated Fading Channels", Communications, 2006. APCC '06. Asia-Pacific Conference, Aug. 31, 2006.

A. Nallanathan et al., "On the Performance of MC-CDMA with Transmit Diversity over Fast Frequency Selective Fading Channels" Vehicular Technology Conference, 2004. VTC 2004-Spring. 2004 IEEE 59th, May 17, 2004.

Luo Wei et al., "Space-Time-Frequency Block Coding Over Rayleigh Fading Channels for OFDM Systems", Communication Technology Proceedings, 2003. ICCT 2003. International Conference, Apr. 9, 2003.

Wei Zhang et al., "Advances in Space—Time/Frequency Coding for Next Generation Broadband Wireless Communications", Radio and Wireless Symposium, 2007 IEEE, Jan. 9, 2007.

Kenji Suto et al., "Performance Evaluation of Space-Time-Frequency Block Codes over Frequency Selective Fading Channels", IEICE Technical Report, Aug. 23, 2002, RCS2002-156.

Y. Karasawa, "MIMO Propagation Channel Modeling" IEICE Trans. Commun., vol. E88-B, No. 5, pp. 1829-1842, May 2005.

Y.Karasawa, "Innovative Antennas and Propagation Studies for MIMO Systems", IEICE Trans. Commun., vol. E90-B, No. 9, pp. 2194-2202, Sep. 2007.

S. Sampei et al., "Wireless Distributed Network: for Flexible Networking and Radio Resource Management", IEICE Trans. Commun., vol. E93-B, No. 12, pp. 3218-3227, Dec. 2010.

T. Ohgane et al., "Applications of Space Division Multiplexing and Those Performance in a MIMO Channel", IEICE Tans. Commun. (Japanese Edition), vol. J87-B, No. 9, pp. 1162-1173, Sep. 2004.

G.J.Foschini et al., "Simplified Processing for High Spectral Efficiency Wireless Communication Employing Multi-Element Arrays", IEEE J. Sel. Areas Commun., vol. 17, No. 11, pp. 1841-1852, Nov. 1999.

P.W.Wolniansky et al., "V-BLAST: An Architecture for Realizing Very High Data Rates Over the Rich-Scattering Wireless Channel", Proc.IEEE ISSSE 98, pp. 295-300, Pisa, Sep. 29,-Oct. 2, 1998.

G.D.Golden at al., "Detection algorithm and initlial laboratory results using V-BLAST space-time comunication architecture", Electron Lett., Vo.35, No. 1, pp. 14-16, Jan. 1999.

K.Ban et al., "Joint Optimization of Tansmitter/Receiver with Multiple Transmit/Receive Antennas in Band-Limited Channels", IEICE Tans. Commun., vol. E83-B, No. 8, pp. 1697-1704, Aug. 2000.

H.Sampath et al., "Generalized Linear Precoder and Decoder Design for MIMO Channels Using the Weighted MMSE Criterion", IEEE Trans. Commun., vol. 49, No. 12, pp. 2198-2206, Dec. 2001.

J.B.Andersen, "Array Gain and Capacity for Known Random Channels with Multiple Element Arrays at Both Ends", IEEE J. Sel. Areas Commun. vol. 18, No. 11, pp. 2172-2178, Nov. 2000.

S.M Alamouti, "A Simple Transmit Diversity Technique for Wireless Communications", IEEE J. Sel. Areas Commun., vol. 16, No. 8, pp. 1451-1458, Oct. 1998.

V. Tarokh et al., "Space-Time Codes for High Data Rate Wireless Communication: Performance Criterion and Code Construction", IEEE Tans. Inf. Theory, vol. 44, No. 2, pp. 744-765, Mar. 1998.

S. Liu et al., "Spreading Code Design for Downlink Space-Time-Frequency Spreading CDMA", IEEE Trans. Veh. Technol., vol. 57, No. 5, pp. 2933-2946, Sep. 2008.

A. Ren et al., "Downlink frequency-selective fading channel blind estimation for space-time coded MIMO MC-CDMA systems", Proc. ISSPA 2005, pp. 683-686, Aug. 2005.

K. Chiba et al. "Multitone-Hopping CDMA Using Feedback-Controlled Hopping Pattern for Decentralized Multiple Access", IEICE Trans. Fundamentals, vol. E91-A, No. 12, pp. 3723-3730, Dec. 2008.

S. Haykin, "Adaptive Filter Theory", 3rd, ed., Prentice Hall, New Jersey, 1996.

T. Miyatake et al., "Asynchronous, Decentralized DS-CDMA Using Feedback-Controlled Spreading Sequences for Time-Dispersive Channels", IEICE Trans. Commun., vol. E91-B, No. 1, pp. 53-61, Jan. 2008.

K. Chiba et al., "Iterative Algorithm for Reducing the Peak-to-Average Power Ratio of Feedback-Controlled Multitone-Hopping CDMA Signals", IEICE Trans. Commun., vol. E93-B, No. 11, pp. 3072-3082, Nov. 2010.

K. Miyashita et al., "High Data-rate Transmission with Eigenbeamspace Division Multiplexing (E-SDM) in a MIMO Channel", Proc. IEEE VTC 2002-Fall, vol. 3, pp. 1302-1306, Sep. 2002.

Chen, Q., et al., "Multicarrier CDMA with Adaptive Frequency Hopping for Mobile Radio Systems," IEEE Journal in Selected Area in Communications, vol. 14, No. 9, pp. 1852-1858 (1996).

Einarsson, G., "Address Assignment for a Time-Frequency-Coded, Spread-Spectrum System," The Bell System Technical Journal, vol. 59, No. 7, pp. 1241-1255 (1980).

Lee, K., and Lee, G., "Adaptive Multi-carrier Direct-Sequence CDMA System Using Fast-Frequency-Hopping," Computational Science and Its Applications—ICCSA, vol. 3984, pp. 952-957 (2006).

Li, X., and Cimini, L.J. Jr., "Effects of Clipping and Filtering on the Performance of OFDM," IEEE Communication Letters, vol. 2, No. 5, pp. 131-133 (1998).

Madhow, U and Honig, M.L., "MMSE Interference Suppression for Direct-Sequence Spread-Spectrum CDMA," IEEE Transaction on Communications, vol. 42, No. 12, pp. 3178-3188 (1994).

Popovic, B.M., "Synthesis of Power Efficient Multitone Signals with Flat Amplitude Spectrum," IEEE Transaction on Communications, vol. 39, No. 7, pp. 1031-1033 (1991).

Rupf, M., and Massey, J.L., "Optimum Sequence Multisets for Synchronous Code-Division Multiple-Access Channels," IEEE Transaction Information Theory, vol. 40, No. 4, pp. 1261-1266 (1994).

Ulukus, S., and Yates, R.D., "Iterative Construction of Optimum Signature Sequence Sets in Synchronous CDMA Systems," IEEE Transactions on Information, vol. 47, No. 5, pp. 1989-1998 (2001).

Welch, L.R., "Lower Bounds on the Maximum Cross Correlation of Signals," IEEE Transaction Information Theory, vol. 20, No. 3. pp. 397-399, (1974).

Atarashi, H., et al., "Variable Spreading Factor-Orthogonal Frequency and Code Division Multiplexing (VSF-OFCDM) for Broadband Packet Wireless Access," IEICE Transactions on Communications, vol. E86-B, No. 1, pp. 291-299 (2003).

Chiba, K., et al., "Performance of Multitone Hopping CDMA Using Feedback-Controlled Hopping Pattern Over Multipath Channel," The Institute of Electronics, Information and Communication Engineers, Technical Report of IEICE, vol. 107, No. 395, pp. 41-46 (2007).

Esmailzadeh, R., and Nakagawa, M., "Pre-RAKE Diversity Combination for Direct Sequence Spread Spectrum Mobile Communications Systems," International Conference on Communication. vol. E76-B. No. 8. pp. 1008-1015 (1993).

Yoshida, S., et al., "DS/CDMA Adaptive Interference Canceller on Differential Detection for Fast Fading Channel," IEICE Transaction, vol. J77-B-II, No. 11, pp. 618-627 (1994).

Hamada, S., et al., "A Proposed DS/CDMA System Using Analog PN Sequences Produced by Adaptive Filters," IEICE Transactions, vol. E81-A, No. 11, pp. 2261-2268 (1998).

Miyatake, T., et al., "Performance of DS/SS System Using Feedback Controlled Spreading Sequence over a Multipath Channel," Proc. ISITA2004., pp. 567-571 (2004).

Ochiai, H. And Imai, H., "Block Coding Scheme Based on Complementary Sequences for Multicarrier Signals," IEICE Transactions Fundamentals, vol. E80-A, No. 11, pp. 2136-2143 (1997).

Chiba, K., and Hamamura, M., "Peak-To-Average Power Ratio of Multitone-Hopping CDMA Signals Using Feedback-Controlled Hopping Patterns," Proc. WINSYS2008, pp. 145-150, Porto, Jul. 2008.

Bauml, R.W., et al., "Reducing the peak-to-average power ratio of multicarrier modulation by selected mapping," Electronics Letter, vol. 32, No. 22, pp. 2056-2057 (1996).

(56) References Cited

OTHER PUBLICATIONS

Love, D.J., et al., "An Overview of Limited Feedback in Wireless Communication Systems," IEEE Journal on Selected Areas in Communications, vol. 26, No. 8, pp. 1341-1365 (2008).

Esmailzadeh, R., and Nakagawa, M., "Pre-Rake Diversity Combination for Direct Sequence Spread Spectrum Communications Systems," IEEE International Conference on Communications (ICC'93), pp. 463-467, May 1993.

* cited by examiner

Fig. 3

| Message | Embodiment | Eigenmode MIMO-MCM |
|---|---|---|
| | QPSK | QPSK, 16QAM, 64QAM |
| $N_t$ | 2 | |
| $N_r$ | 2, 3 | |
| $N_d$ | 2 | |
| $L$ | 5 | 1 |
| $\alpha$ | 5 | - |
| $M$ | 4 | 16 |
| $T_f$ | $10^4 T_s$ | - |
| $N_f$ | 10 | - |
| $\Delta_k$ | Uniform distribution in $[0, T_f)$ | - |
| Adaptive algorithm | N-LMS ($\mu = 0.1$) | - |
| Guard interval | Unused | Zero-padding |

COMMUNICATION APPARATUS, COMMUNICATION SYSTEM, COMMUNICATION METHOD AND COMPUTER-READABLE STORAGE MEDIUM

TECHNICAL FIELD

The present disclosure relates to communication apparatuses, communication systems, communication methods, and computer-readable storage media to perform wireless communication.

BACKGROUND ART

In recent years, MIMO (Multi-Input Multi-Output) transmission systems have been widely investigated to increase the channel capacity. The MIMO transmission may be categorized into two types, namely, a multi-stream transmission and a single-stream transmission. In the multi-stream transmission, the SDM (Space Division Multiplexing), as typified by V-BLAST (Vertical-Bell Laboratories Layered Space-Time), and an eigenmode transmission scheme that significantly increases the transmission channel capacity, have been proposed. In the single-stream transmission, the MRC (Maximal Ratio Combining) and the STBC (Space-Time Block Code) transmission, which may yield significant improvements in the SINR (Signal-to-Interference plus Noise Ratio) by space diversity, have been proposed.

To gain multiple-access capability in the MIMO transmission systems, the MIMO-CDMA (Code Division Multiple Access) has been studied. For downlink of the MIMO system, the STFS-CDMA (Space-Time-Frequency Spreading) has been proposed. The STFS-CDMA transmits a three-dimensional signal (space, time, and frequency) and employs the Walsh-Hadamard code, double orthogonal code, and the like. The STFS-CDMA employs CP (Cyclic Prefix) and MMSE (Minimum Mean-Squared Error) detector to improve its performance. The MIMO MC-CDMA systems that employ the STBC coding technique was proposed for the downlink MIMO transmission. However, these systems require a complete set of CSI (Channel-State Information), and thus, a complex computation process, in order to obtain a relatively high MIMO performance.

SUMMARY

One aspect of the embodiment may provide a technology for realizing a relatively high MIMO performance. This technology may generate or update a STF code, that may reduce a BER (Bit Error Rate), at a receiving end without knowledge of CSI of time-dispersive multipath channels for spatially distributed apparatuses that may transmit signals asynchronously, to be fed back to a transmitting end.

According to one aspect of the embodiment, a communication apparatus communicatable with an external transmitter by MIMO (Multi-Input Multi-Output) transmission, may include a receiver configured to receive signals from the transmitter through a plurality of receiver antennas, wherein the receiver includes a filter configured to filter the signals received through the plurality of receiver antennas, and having a weight matrix thereof updated by an adaptive algorithm with respect to each substream message symbol from the transmitter; and a code generator configured to feed back a part of the weight matrix updated by the filter, as an updated STF (Space-Time-Frequency) code, to the transmitter.

According to another aspect of the embodiment, a communication apparatus communicatable with an external receiver by MIMO (Multi-Input Multi-Output) transmission, may include a transmitter configured to transmit signals to the receiver through a plurality of transmission antennas, wherein the transmitter includes a signature waveform generator configured to generate a signal based on a STF (Space-Time-Frequency) code for a substream message symbol to be transmitted from each of the plurality of transmission antennas, and update the STF code based on which the signal is generated to an updated STF code in response to a feedback from the receiver, wherein the feedback includes a part of a weight matrix updated by a filter within the receiver with respect to each substream message symbol transmitted from the transmitter, as the updated STF code.

According to another aspect of the embodiment, a communication system or a communication method may utilize the communication apparatus including the transmitter and the communication apparatus including the receiver described above.

According to another aspect of the embodiment, a non-transitory computer-readable storage medium may store a program which, when executed by a computer, causes the computer to perform a wireless communication process of the communication apparatus described above.

The foregoing summary is illustrative only and is not intended to be in any way limiting. In addition to the illustrative aspects, embodiments, and features described above, further aspects, embodiments, and further features will be apparent from the following detailed description when read in conjunction with the accompanying drawings.

BRIEF DESCRIPTION OF DRAWINGS

FIG. 3 is a diagram illustrating an example of specifications of the embodiment and the eigenmode MIMO-MCM (MIMO-Multi-Carrier Modulation);

DESCRIPTION OF EMBODIMENTS

Figure 1:
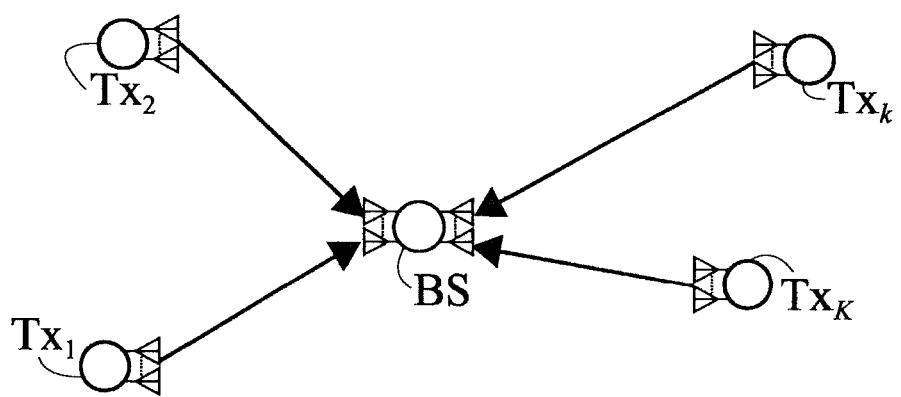
FIG. 1 is a diagram for explaining an example of a MIMO uplink multiple access in a communication system in accordance with an embodiment.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It may be readily understood that aspects of this disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to apparatuses, systems, methods and/or computer-readable storage media related to wireless (or radio) communication.

Briefly stated, techniques are generally described herein for wireless communication.

This disclosure may utilize a FC-CDMA (Feedback-Controlled Code Division Multiple Access) using the MIMO transmission, that is, MIMO/FC-CDMA, in order to improve the SINR. A communication apparatus at a receiving end of a communication system employing the MIMO/FC-CDMA may include filter, such as a three-dimensional adaptive FIR (Finite-duration Impulse Response) filter or IIR (Infinite-duration Impulse Response) filter. The communication apparatus at the receiving end may feed back a part of FIR filter weights (or coefficients), by a STF (Space-Time-Frequency) code generator, to a communication apparatus at a transmitting end of the communication system. The FIR filter may be larger than the STF code generator that generates the STF code. In the following, the communication apparatus at the transmitting end may simply be referred to as a transmitter, and the communication apparatus at the receiving end may simply be referred to as a receiver, however, the communication apparatus may include a transmitter and/or a receiver.

(Communication System)

FIG. 1 is a diagram for explaining an example of a MIMO uplink multiple access (or asynchronous transmission) in a communication system in accordance with an embodiment. In this example, it may be assumed for the sake of convenience that an uplink multi-antenna multiple access is performed in a communication system 1, as illustrated in FIG. 1, where $Tx_k$ denotes the kth transmitter (k=1, 2, ..., K; K is the number of users or transmitters within a communication system) that has $N_t$ transmission antennas, and BS denotes a base station that has $N_r$ receiver antennas. The kth transmitter may be located externally to the base station BS. For the sake of convenience in evaluating the performance of the communication system 1 as will be described later, the base station BS may be regarded as including K receivers $Rx_1, ..., Rx_K$. Although only one base station BS is illustrated in FIG. 1, a plurality of base stations BS may be provided. $N_t$ and $N_r$ may be the same or different from each other. In addition, $N_r$ may be the same as or be different from K.

Of course, when no base station BS exists, a decentralized asynchronous multiple access may be made between the transmitters $Tx_1, ..., Tx_K$ and the receivers $Rx_1, ..., Rx_K$.

(Transmitter)

Figure 2:
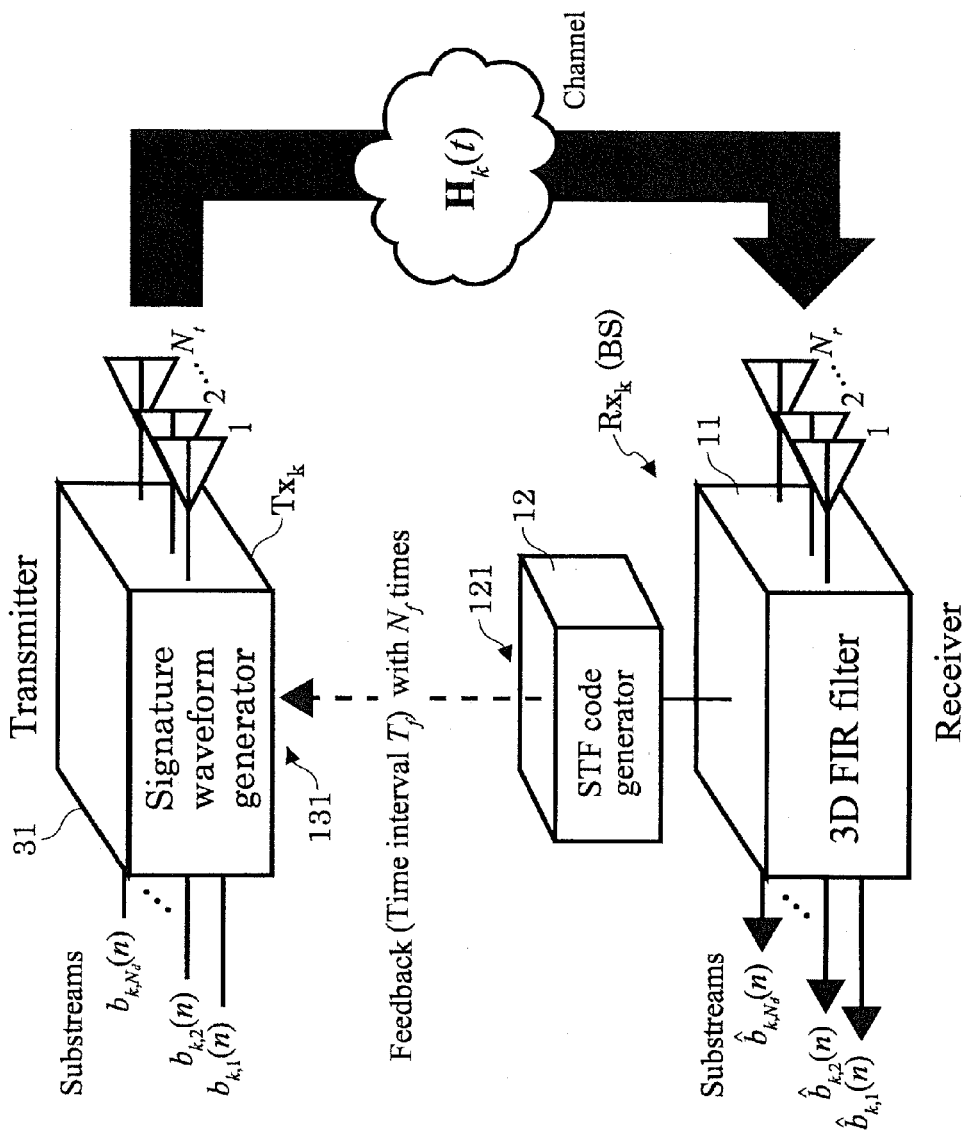
FIG. 2 is a diagram illustrating a transmitter and a receiver of MIMO/FC-CDMA.

FIG. 2 is a diagram illustrating a transmitter and a receiver of MIMO/FC-CDMA. The transmitter $Tx_k$ includes a signature waveform generator 31, and $N_t$ transmission antennas.

A signature waveform $c_{k,d,x}(t)$ transmitted from an xth transmission antenna (x=1, 2, ..., $N_t$) of the kth transmitter $Tx_k$ may be given by the following formula (1)

$$c_{k,d,x}(t) = \sum_{l=1}^{L} a_{k,d,x,l}(t-(l-1)T_c), \tag{1}$$

where $a_{k,d,x,l}(t)$ ($0<t<T_c$; $T_c$[s] is the chip duration) is the lth chip waveform (l=1, 2, ..., L; L is the number of chips) for $c_{k,d,x}(t)$, which is a multicarrier signal and may be given by the following formula (2)

$$a_{k,d,x,l}(t) = g(t)\sum_{m=1}^{M} p_{k,d,x,l,m} e^{j2\pi \frac{m-1}{T_c}t}, \tag{2}$$

where $j=\sqrt{(-1)}$, $p_{k,d,x,l,m}$ is the complex amplitude of the mth tone of frequency $(m-1)/T_c$ [Hz] (m=1, 2, ..., M; M is the number of transmittable tones per chip) for the lth chip of $c_{k,d,x}(t)$, and $g(t)=\{1(0<t<T_c), 0(\text{otherwise})\}$.

It may be assumed for the sake of convenience that $P_{k,d,x}$ represented by the following formula (3) is an L×M matrix that includes $p_{k,d,x,l,m}$ such that $$P_{k,d,x} = \begin{bmatrix} p_{k,d,x,1,1} & p_{k,d,x,1,2} & \cdots & p_{k,d,x,1,M} \\ p_{k,d,x,2,1} & p_{k,d,x,2,2} & \cdots & p_{k,d,x,2,M} \\ \vdots & \vdots & \ddots & \vdots \\ p_{k,d,x,L,1} & p_{k,d,x,L,2} & \cdots & p_{k,d,x,L,M} \end{bmatrix}. \tag{3}$$

The matrix $P_{k,d,x}$ may be referred to as the STF code for a dth substream message symbol transmitted from the xth transmission antenna of the kth transmitter $Tx_k$.

The signal transmitted from the xth antenna (x=1, 2, ..., $N_t$) of the kth transmitter $Tx_k$ may be given by the following formula (4)

$$s_{k,x}(t) = \sum_{n=0}^{\infty} \sum_{d=1}^{N_d} b_{k,d}(n) c_{k,d,x}(t-nT_s), \tag{4}$$

where $b_{k,d}(n)$ is a complex message symbol of the dth substream message symbol transmitted in $nT_s<t<(n+1)T_s$ (n=0, 1, ...), and $T_s$[s] is the symbol duration ($T_s=LT_c$). In this example, it may be assumed that $b_{k,d}(n)$ is a QPSK (Quaternary Phase-Shift Keying) symbol.

(Channel)

It may be assumed for the sake of convenience that $H_k(t)$ is an impulse response matrix of size $N_r \times N_t$ represented by the following formula (5), that is, $$H_k(t) = \begin{bmatrix} h_{k,1,1}(t) & h_{k,1,2}(t) & \cdots & h_{k,1,N_t}(t) \\ h_{k,2,1}(t) & h_{k,2,2}(t) & \cdots & h_{k,2,N_t}(t) \\ \vdots & \vdots & \ddots & \vdots \\ h_{k,N_r,1}(t) & h_{k,N_r,2}(t) & \cdots & h_{k,N_r,N_t}(t) \end{bmatrix}, \tag{5}$$

through which the signal $s_{k,x}(t)$ may be transmitted from the xth antenna of the kth transmitter $Tx_k$ to a yth antenna of the kth receiver $Rx_k$ in the base station BS, and may be given by the following formula (6)

$$h_{k,y,x}(t) = \sum_{i=1}^{I_{k,y,x}} h_{k,y,x,i} \delta(t - \tau_{k,y,x,i}), \qquad (6)$$

where $h_{k,y,x,i}(=|h_{k,y,x,i}|e^{j\theta_{k,y,x,i}})$ is the complex gain constant for the ith path of the channel, $\tau_{k,y,x,i}$ ($0 \leq \tau_{k,y,x,i} < T_s$) is the delay for the ith path, and $I_{k,y,x}$ is the number of paths of the channel.

The received signal $r_y(t)$ of the yth antenna of the kth receiver $Rx_k$ may be given by the following formula (7)

$$r_y(t) = \sum_{k=1}^{K} \sum_{x=1}^{N_t} (s_{k,x}(t) * h_{k,y,x}(t)) + \eta_y(t), \qquad (7)$$

where $n_y(t)$ is an AWGN (Additive White Gaussian Noise) with a double-sided power spectral density of $N_0/2$ [W/Hz].

(Receiver)

The kth receiver $Rx_k$ includes $N_r$ receiver antennas, a three-dimensional adaptive FIR filter 11, which may have $(L+\alpha) \times M \times N_r$ complex weights ($0 \leq \alpha \leq L$), and a STF code generator 12. It may be assumed for the sake of convenience that $W_{k,d,y}$ is an $(L+\alpha) \times M$ matrix represented by the following formula (8) that includes the complex weights $W_{k,d,y,l,m}$ of the yth antenna for the kth receiver $Rx_k$, such that $$W_{k,d,y} = \begin{bmatrix} w_{k,d,y,1,1} & w_{k,d,y,1,2} & \cdots & w_{k,d,y,1,M} \\ w_{k,d,y,2,1} & w_{k,d,y,2,2} & \cdots & w_{k,d,y,2,M} \\ \vdots & \vdots & \ddots & \vdots \\ w_{k,d,y,L,1} & w_{k,d,y,L,2} & \cdots & w_{k,d,y,L,M} \\ w_{k,d,y,L+1,1} & w_{k,d,y,L+1,2} & \cdots & w_{k,d,y,L+1,M} \\ w_{k,d,y,L+2,1} & w_{k,d,y,L+2,2} & \cdots & w_{k,d,y,L+2,M} \\ \vdots & \vdots & \ddots & \vdots \\ w_{k,d,y,L+\alpha,1} & w_{k,d,y,L+\alpha,2} & \cdots & w_{k,d,y,L+\alpha,M} \end{bmatrix}. \qquad (8)$$

The weight matrix $W_{k,d,y}$ may be updated by an adaptive algorithm. In this example, a known N-LMS (Normalized-Least-Mean-Square) algorithm may be adopted, which may be one of the less complex adaptation algorithms.

It may be assumed for the sake of convenience that the kth receiver $Rx_k$ is synchronized with the first path of a desired signal $s_{k,x}(t)$. The kth receiver $Rx_k$ may obtain discrete-time samples of every frequency and chip from the received signal $r_y(t)$. The mth frequency component $r_{k,y,l,m}(n)$, detected at $t = nT_s + lT_c + \tau_{k,y,x,l}$ ($l = 1, 2, \ldots, L+\alpha$), may be given by the following formula (9)

$$r_{k,y,l,m}(n) = \int_{nT_s + (l-1)T_c + \tau_{k,y,x,1}}^{nT_s + lT_c + \tau_{k,y,x,1}} r_y(t) e^{-j\frac{2\pi(m-1)}{T_c} t} dt. \qquad (9)$$

An $(L+\alpha) \times M$ matrix $R_{k,y}(n)$, that includes the samples detected in $nT_s + \tau_{k,y,x,l} < t < nT_s + (L+\alpha)T_c + \tau_{k,y,x,l}$, may be defined by the following formula (10).

$$R_{k,y}(n) = \begin{bmatrix} r_{k,y,1,1}(n) & r_{k,y,1,2}(n) & \cdots & r_{k,y,1,M}(n) \\ r_{k,y,2,1}(n) & r_{k,y,2,2}(n) & \cdots & r_{k,y,2,M}(n) \\ \vdots & \vdots & \ddots & \vdots \\ r_{k,y,L,1}(n) & r_{k,y,L,2}(n) & \cdots & r_{k,y,L,M}(n) \\ r_{k,y,1,1}(n+1) & r_{k,y,1,2}(n+1) & \cdots & r_{k,y,1,M}(n+1) \\ r_{k,y,2,1}(n+1) & r_{k,y,2,2}(n+1) & \cdots & r_{k,y,2,M}(n+1) \\ \vdots & \vdots & \ddots & \vdots \\ r_{k,y,\alpha,1}(n+1) & r_{k,y,\alpha,2}(n+1) & \cdots & r_{k,y,\alpha,M}(n+1) \end{bmatrix} \qquad (10)$$

The FIR filter output $\tilde{b}_{k,d}(n)$ may be represented by the following formula (11)

$$\tilde{b}_{k,d}(n) = \sum_{y=1}^{N_r} tr\left[W_{k,d,y}^{\mathcal{H}}(n) R_{k,y}(n)\right], \qquad (11)$$

where the superscript $\mathcal{H}$ denotes the complex conjugate and the transpose of the matrix, and $tr[\cdot]$ denotes the trace of the matrix. In order to recover the message symbol $b_{k,d}(n)$, the kth receiver $Rx_k$ may determine the signs for the real and imaginary parts of $\tilde{b}_{k,d}(n)$ such that the following formula (12) stands)=

$$\hat{b}_{k,d}(n) = sgn[Re[\tilde{b}_{k,d}(n)]] + j sgn[Im[\tilde{b}_{k,d}(n)]], \qquad (12)$$

where $sgn[\cdot]$ is the signum function, $Re[\cdot]$ is the real part of the complex value, and $Im[\cdot]$ is the imaginary part of the complex value.

The weight matrix $W_{k,d,y}(n)$ may be updated by the following formula (13), such that $$W_{k,d,y}(n+1) = W_{k,d,y}(n) + \frac{\mu}{tr\left[R_{k,y}^{\mathcal{H}}(n) R_{k,y}(n)\right]} R_{k,y}(n) e_{k,d,y}^*(n), \qquad (13)$$

where $\mu$ is the step size parameter, the superscript * denotes the complex conjugate, and $e_{k,d,y}(n)$ may be given by the following formula (14)

$$e_{k,d,y}(n) = \hat{b}_{k,d}(n) - tr[W_{k,d,y}^{\mathcal{H}}(n) R_{k,y}(n)]. \qquad (14)$$

In this example, the initial value $W_{k,d,y}(0)$ of the weight matrix $W_{k,d,y}(n)$ for the kth receiver $Rx_k$ may be chosen to be a set of weights that includes the zero matrix $0_{(L+\alpha) \times M}$ of size $(L+\alpha) \times M$.

(Feedback)

A part of the FIR filter weights of the kth receiver $Rx_k$ may be fed back to the corresponding kth transmitter $Tx_k$ to be used as an updated version of the STF code $P_{k,d,x}$, in order to improve the SINR. Further, successive feedback of the updated version of the STF code $P_{k,d,x}$ to the transmitter $Tx_k$ may optimize the SINR. In this example, it may be assumed for the sake of convenience that there is no delay time and no error for the feedback. Therefore, the STF code $P_{k,d,x}(\phi)$ updated at $t = \phi T_f + \Delta_k + \alpha T_c + \tau_{k,y,x,l}$ ($\phi = 1, 2, \ldots, N_f$; $N_f$ is the number of iterations of the feedback, $T_f$ is the feedback time interval, and $\Delta_k$ is the preassigned offset of the feedback timing ($0 \leq \Delta_k < T_f$)) may be represented by the following formula (15)

$$P_{k,d,x}(\varphi) \triangleq \begin{bmatrix} p_{k,d,x,1,1}(\varphi) & p_{k,d,x,1,2}(\varphi) & \cdots & p_{k,d,x,1,M}(\varphi) \\ p_{k,d,x,2,1}(\varphi) & p_{k,d,x,2,2}(\varphi) & \cdots & p_{k,d,x,2,M}(\varphi) \\ \vdots & \vdots & \ddots & \vdots \\ p_{k,d,x,L,1}(\varphi) & p_{k,d,x,L,2}(\varphi) & \cdots & p_{k,d,x,L,M}(\varphi) \end{bmatrix}, \quad (15)$$

where $p_{k,d,x,l,m}(\phi)$ may be represented by the following formula (16)

$$p_{k,d,x,l,m}(\varphi) = tr\left[\left[\sum_{y=1}^{N_r} w_{k,y,x,l,m}(\hat{n}) \overline{R}_{k,d,y}\right]^{\textit{\tiny H}} \tilde{P}_{k,d,x}(\varphi-1)\right], \quad (16)$$

where $\hat{n}^\varphi \lfloor (\phi T_f + \Delta_k + \alpha T_c + \tau_{k,y,x,l})/T_x \rfloor$, $\lfloor \cdot \rfloor$ is the largest integer that is less than or equal to the operand, $\overline{R}_{k,d,y}$ is the expectation of $\hat{b}_{k,d}*(n) R_{k,y}$ in $(\phi-1)T_f + \Delta_k + \alpha T_c + \tau_{k,y,x,l} < t < \phi T_f + \Delta_k + \alpha T_c + \tau_{k,y,x,l}$, and $\tilde{P}_{k,d,x}(\phi-1)$ is an $(L+\alpha) \times M$ matrix that includes $p_{k,d,x,l,m}(\phi-1)$. The initial value $\tilde{P}_{k,d,x}(0)$ may be chosen to be a set of weights that includes the corresponding initial STF code $P_{k,d,x}(0)$ and the zero matrix $0_{\alpha \times M}$ of size $\alpha \times M$, as represented by the following formula (17)

$$\tilde{P}_{k,d,x}(0) = [P_{k,d,x}^T(0) \; 0_{\alpha \times M}^T]^T, \quad (17)$$

where the superscript T denotes the transpose of the matrix.

When the updated STF code $P_{k,d,x}(\phi)$, whose elements $p_{k,d,x,l,m}(\phi)$ may be represented by the formula (16) is fed back to the kth transmitter $Tx_k$, this updated STF code $P_{k,d,x}(\phi)$ may be used in place of the previous STF code $P_{k,d,x}$ represented by the formula (3) in order to generate and transmit the signal represented by the formula (4) from the xth antenna (x=1, 2, . . . , $N_t$) of the transmitter $Tx_k$. As a result, the transmitter $Tx_k$ may make the transmission from the xth antenna using the updated STF code which may be optimized for the current channel state than the STF code used previously, and such a transmission using the corresponding updated STF code may be made separately for each of the first through $N_t$th antennas.

In this example, the illustration of individual transmission antennas of the receiver $Rx_k$ and the illustration of individual receiver antennas of the transmitter $Tx_k$ is omitted for the sake of convenience. In FIG. 2, the receiver $Rx_k$ is illustrated as having a transmission antenna part 121 that includes the transmission antennas through which the feedback of the updated STF code may be made, and the transmitter $Tx_k$ is illustrated as having a receiver antenna part 131 that includes the receiver antennas through which the feedback from the receiver $Rx_k$ may be received. The feedback of the updated STF code from the receiver $Rx_k$ to the transmitter $Tx_k$ may be made through an arbitrary feedback channel, and thus, the number of transmission antennas in the transmission antenna part 121 of the receiver $Rx_k$ and the number of receiver antennas in the receiver antenna part 131 of the transmitter $Tx_k$ may respectively be set arbitrarily. For example, the feedback channel may be similar to or, may be different from the channel used for the transmission from the transmitter $Tx_k$ to the receiver $Rx_k$. In the latter case, the carrier frequency used for the transmission in the channel from the transmitter $Tx_k$ to the receiver $Rx_k$ may be different from the carrier frequency used for the feedback in the feedback channel from the receiver $Rx_k$ to the transmitter $Tx_k$.

(Performance Evaluation)

In this embodiment, the uplink asynchronous multiple access performance of the embodiment over time-invariant multipath channels may be observed. Results are illustrated in comparison with the eigenmode MIMO-MCM, as described below, and it may be confirmed that the embodiment achieves satisfactory performance without explicit knowledge of the CSI.

The eigenmode MIMO-MCM may require the frequency response matrix $H_m$ for the mth tone of frequency $(m-1)/T_s$ to be given by the following formula (18)

$$H_m = \int_{nT_s+\tau_{y,x,1}}^{(n+1)T_s+\tau_{y,x,1}} H(t) e^{-j\frac{2\pi(m-1)}{T_s}t} dt. \quad (18)$$

The SVD (Singular-Value Decomposition) for the matrix $H_m$ may be given by the following formula (19)

$$H_m = U_m \sum_m V_m^H, \quad (19)$$

where $U_m$ is a unitary matrix of size $N_r \times N_r$, $V_m$ is a unitary matrix of size $N_t \times N_t$, and $\Sigma_m = \text{diag}[\sqrt{(\lambda_{m,1})}, \sqrt{(\lambda_{m,2})}, \ldots, \sqrt{(\lambda_m, N_m)}](Nm \le \min(N_t, N_r)$. Since M different frequencies may be used, there may exist $$N_{ch} = \sum_{m=1}^{N} N_m$$

different eigenvalues in total, from which the $N_d (\le N_{ch})$ largest eigenvalues $\lambda_i$ (i=1, 2, . . . , $N_d$) may be found. A precoder and a decoder of the eigenmode MIMO-MCM may use $N_d$ pairs of eigenvectors $v_i$ and $u_i$ that correspond to the eigenvalues $\lambda_i$. In order to minimize the total BER of multistream transmission, a known optimum bit and power assignment scheme may be adopted.

In order to evaluate the performance of the communication system 1 in this embodiment, it may be assumed for the sake of convenience that a twelve-path model (i.e., $I_k=12$ for all k) has a delay profile of exponential decay, where zero-mean complex Gaussian random variables $h_{k,y,x,i}$ are mutually statistically independent, the relative intensities of $\mathbb{E}\;[|h_{k,y,x,i}|]$ are $\quad 10 \quad \log_{10}(\mathbb{E}\;[|h_{k,y,x,i+1}|^2]/\mathbb{E}\;[|h_{k,y,x,i}|^2])=$ are $-1.5$ dB(i=1, 2, . . . , $I_{k,y,x}-1$), $\mathbb{E}\;[\cdot]$denotes the expectation, the path delays $\tau_{k,y,x,i}$ are $\tau_{k,y,x,i+1}-\tau_{k,y,x,i}=(1/64)T_s$, and $\tau_{k,y,x,i}$ and $\theta_{k,y,x,i}$ (for all k, y, x, and i) are mutually statistically independent, uniformly distributed random variables in the intervals of $[0, T_s)$ and $[0, 2\pi)$, respectively.

This embodiment may require an initial training period during which the kth receiver $Rx_k$ may feed back (or return) a part of the FIR filter weights to the corresponding kth transmitter $Tx_k$ in order to generate a suitable STF code for the current channel state. In this example, the initial training period may be defined as $t < (N_f+1)T_f+\Delta_k+\tau_{k,y,x,l}$, and the BER performance in the steady period may be defined as the period after the initial training period, that is, $t \ge (N_f+1)T_f+\Delta_k+\tau_{k,y,x,l}$.

It may be assumed for the sake of convenience that a reference $\hat{b}_{k,d}(n)$ used for updating the filter weights is $\hat{b}_{k,d}(n)=b_{k,d}(n)$ during the initial training period, which may imply that the kth receiver $Rx_k$ has prior knowledge of the pilot data symbols used for the initial training. In the steady period, only the updating of the FIR filter weights may be performed at the kth receiver $Rx_k$, and no feedback may be made to the kth transmitter $Tx_k$. Since the BER performance depends on the randomly chosen values of $\tau_{k,y,x,l}$ and $h_{k,y,x,l}$, all plots indicate the average BER of one hundred simulation trials, for example. Other common specifications may be set as illustrated in FIG. 3, for example. FIG. 3 is a diagram illustrating an example of the specifications of the embodiment and the eigenmode MIMO-MCM (MIMO-Multi-Carrier Modulation).

(Simulation Results)

Figure 4:
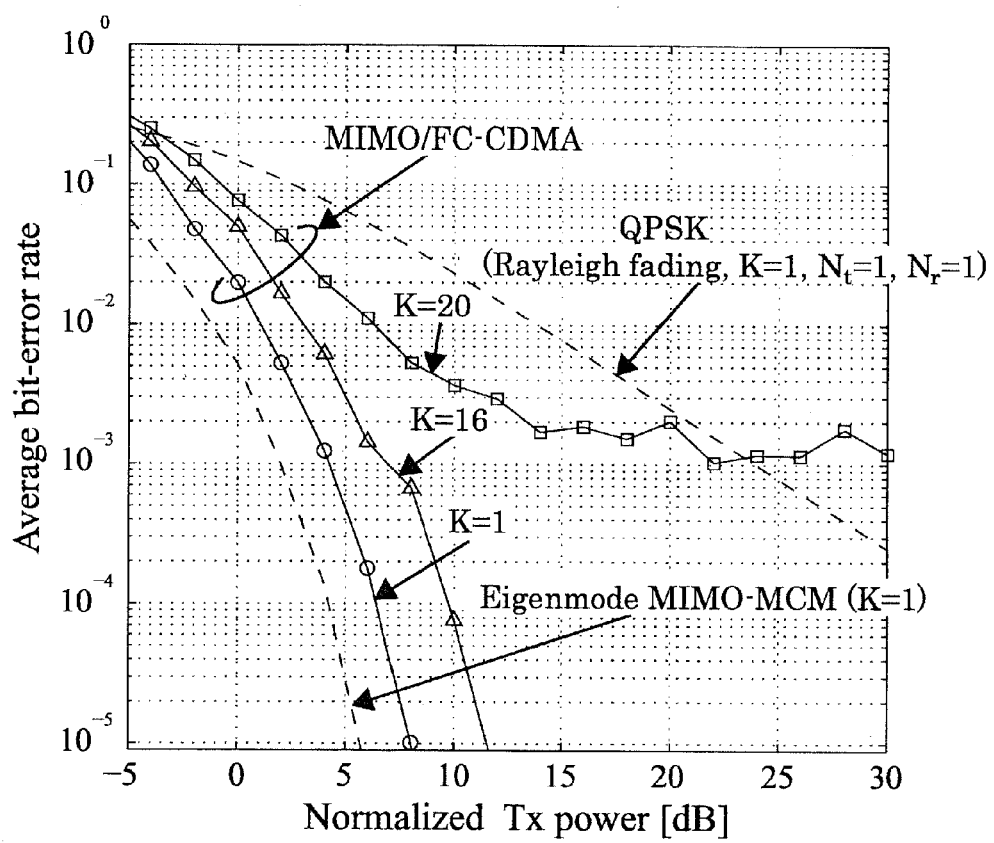
FIG. 4 is a diagram illustrating a BER performance of multistream transmission of an embodiment for $N_t=2$, $N_r=2$, and $N_d=2$.
Figure 5:
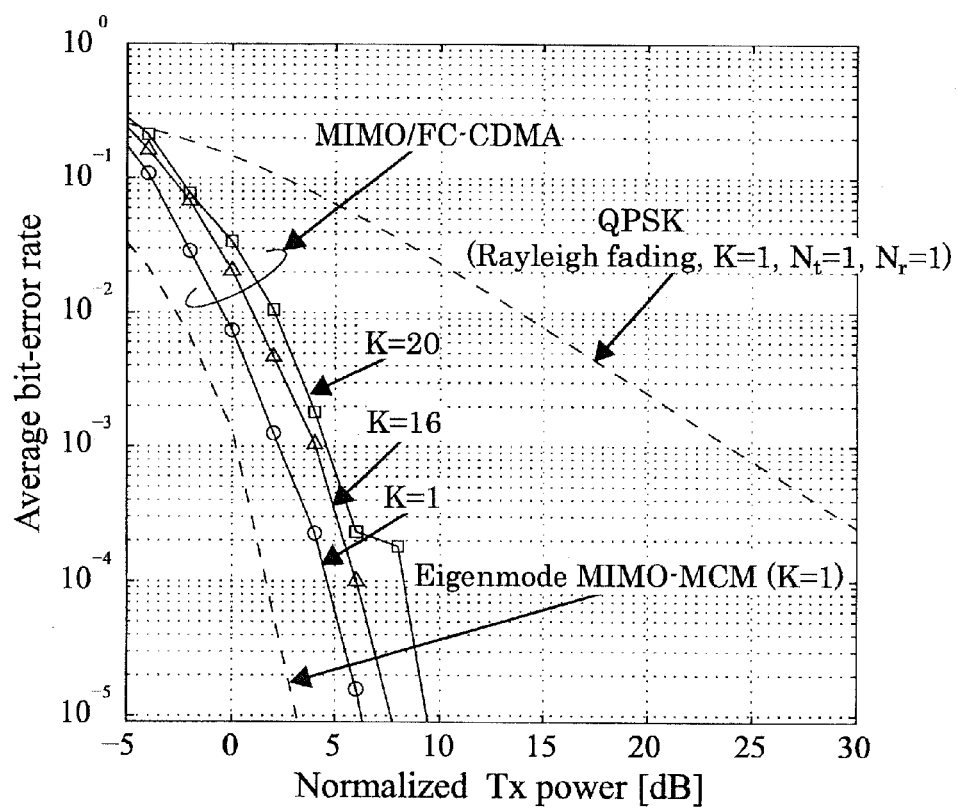
FIG. 5 is a diagram illustrating a BER performance of multistream transmission of the embodiment for $N_t=2$, $N_r=3$, and $N_d=2$.

FIG. 4 is a diagram illustrating a BER performance of multistream transmission in this embodiment for $N_t=2$, $N_r=2$, and $N_d=2$, and FIG. 5 is a diagram illustrating a BER performance of multistream transmission in this embodiment for $N_t=2$, $N_r=3$, and $N_d=2$. In FIGS. 4 and 5, the ordinate indicates an average BER (Bit Error Rate), and the abscissa indicates the normalized transmission (Tx) power [dB]. In other words, the BER performance of the multistream transmission in this embodiment is illustrated in FIG. 4 for ($N_t$, $N_r$)=(2, 2) and in FIG. 5 for ($N_t$, $N_r$)=(2, 3) along with the single user eigenmode MIMO-MCM.

It may be observed from FIG. 4 that there may be about a 2.5 dB loss for K=1 at BER=$10^{-4}$ and about a 5 dB loss for K=16 compared to the single user eigenmode MIMO-MCM. For K=20, an error-floor occurs, as illustrated in FIG. 4. Such an error-floor disappears when the number of receiver antennas increases, as illustrated in FIG. 5.

Although the BER performance of the embodiment may be lower than that of the single user eigenmode MIMO-MCM, the single user MIMO-MCM requires the CSI at both the transmitter and receiver and has no multiple-access capability. Hence, considerable multiple-access interference may occur when two or more transmitters transmit signals in the single user MIMO-MCM. On the other hand, this embodiment does not require the CSI to be known, and has multiple-access capability.

In the MIMO/FC-CDMA in accordance with the embodiment, the BER performance for multistream multiple access may be evaluated over asynchronous multipath channels. It may be found that the embodiment significantly contributes to the improvement of MIMO multiple access performance.

For example, Kazuki Chiba et al., "Multitone-Hopping CDMA Using Feedback-Controlled Hopping Pattern for Decentralized Multiple Access", IEICE TRANS. FUNDAMENTALS, VOL. E91-A, No. 12, pp. 3723-3730, December 2008 demonstrated that the quantization for the feedback may be possible without influencing the BER performance. Thus, it may be regarded that the embodiment may also be effective for limited feedback channels. Since the training period may be chosen to be $10^4$ $T_s$, for example, the N-LMS adaptation may be sufficiently accomplished.

(Hardware Configuration)

Figure 6:
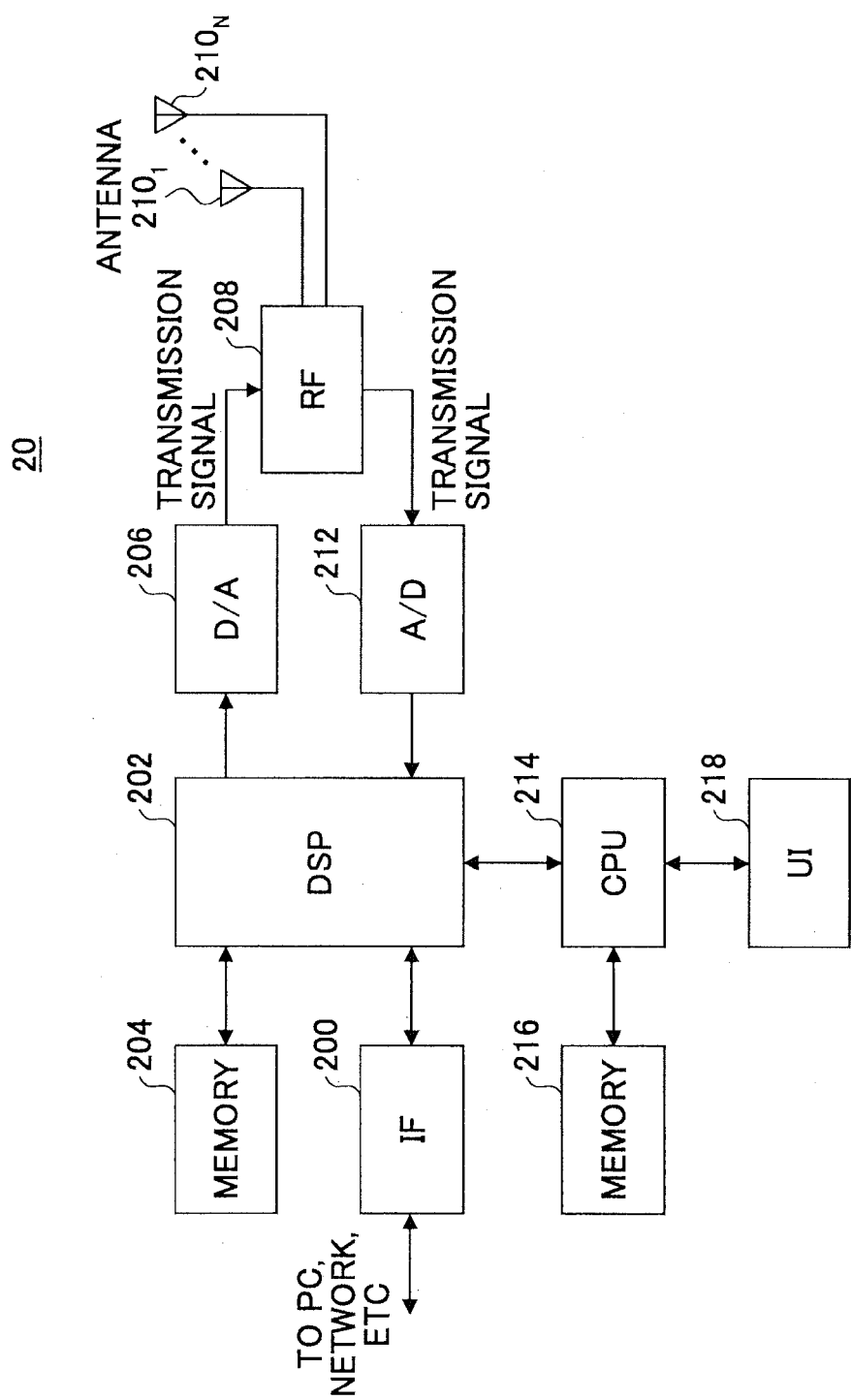
FIG. 6 is a block diagram illustrating an example of a hardware configuration of the communication apparatus.

FIG. 6 is a block diagram illustrating an example of a hardware configuration of the communication apparatus. A communication apparatus 20 illustrated in FIG. 6 may function as a transmitter $Tx_k$ and/or the receiver $Rx_k$ illustrated in FIG. 2.

As illustrated in FIG. 6, the communication apparatus 20 may be connected to a computer such as a PC (Personal Computer) or, to a network such as a LAN, to which a message symbol (transmission data) in QPSK may be output or from which a message symbol may be input.

The communication apparatus 20 includes an IF (Interface) circuit 200, a DSP (Digital Signal Processor) 202, a memory 204 connected to the DSP 202, a D/A (Digital-to-Analog) converter 206, an RF (Radio Frequency) circuit 208, antennas $210_1$ through $210_N$, an A/D (Analog-to-Digital) converter 212, a CPU (Central Processing Unit) 214, a memory 216 connected to the CPU 214, and a UI (User Interface) device 218 that may provide an interface between the communication apparatus 20 and the user. The number N of antennas $210_1$ through $210_N$ may be $N_t$ for the transmission antennas of the transmitter $Tx_k$, and may be $N_r$ for the receiver antennas of the receiver $Rx_k$.

The communication apparatus 20 may include a component such as a cell phone component configured to transmit and/or receive voice and data in CDMA or, a wireless LAN device component configured to serve as a computer allowing software to perform signal processing, wireless communication, information processing, and the like.

It may be assumed for the sake of convenience that the communication apparatus 20 allows software to perform the signal processing and the information processing in the following. However, the communication apparatus 20 may be configured to allow embedded hardware to perform the signal processing and the information processing depending on the configuration, application, and performance requirements thereof.

Moreover, the communication apparatus 20 may use only one of the DSP 202 and the CPU 214, depending on the configuration, application, and performance requirements thereof.

In the communication apparatus 20, the IF circuit 200 may provide a function to input and/or output the message symbol between the communication apparatus 20 and the computer or the network.

The DSP 202 may execute a signal processing program stored in the memory 204 to perform spread spectrum on the message symbol input from the IF circuit 200 or, on the message symbol generated from the voice input through a microphone (not illustrated) of the UI device 218, and output the processed message symbol to the D/A converter 206.

The D/A converter 206 may convert the spread spectrum digital message symbol into analog baseband transmission signals or transmission signals having an intermediate frequency of the frequencies that may be processed by the DSP 202 or the CPU 214, and output the transmission signals to the RF circuit 208.

The RF circuit 208 may convert the transmission signals into transmission signals having a frequency used for the signal transmission between the communication apparatus 20 and other communication apparatuses, and transmit the transmission signals to the paths of the channel through the corresponding antennas $210_1$ through $210_N$.

The RF circuit 208 may receive the transmission signals from the other communication apparatuses through the antennas $210_1$ through $210_N$ or, through antennas (not illustrated) other than the antennas $210_1$ through $210_N$, convert the transmission signals into analog transmission signals of the baseband or intermediate frequency, and output the analog transmission signals to the A/D converter 212.

The A/D converter 212 may convert the analog transmission signals into digital transmission signals and output the digital transmission signals to the DSP 202.

The CPU 214 may execute a program stored in the memory 216 to control the operation of the communication apparatus 20, for example, according to the user operation performed from the UI device 218. In addition, the CPU 214 may perform processes of setting and updating the weights used for filtering the transmission signals received by the DSP 202. The CPU 214 may also control the UI device 218 to provide information and the like to the user.

Each of the memories 204 and 216 may form a non-transitory computer-readable storage medium that stores a program which, when executed by a computer (DSP 202, CPU 214, or the like), causes the computer to function as a transmitter and/or a receiver to perform a wireless communication process. Each of the memories 204 and 216 may be formed by a semiconductor memory device, a recording medium such as a magnetic recording medium, a magneto-optical recording medium and an optical recording medium, a drive configured to make access to such a recording medium, or the like.

(Software Configuration)

Figure 7:
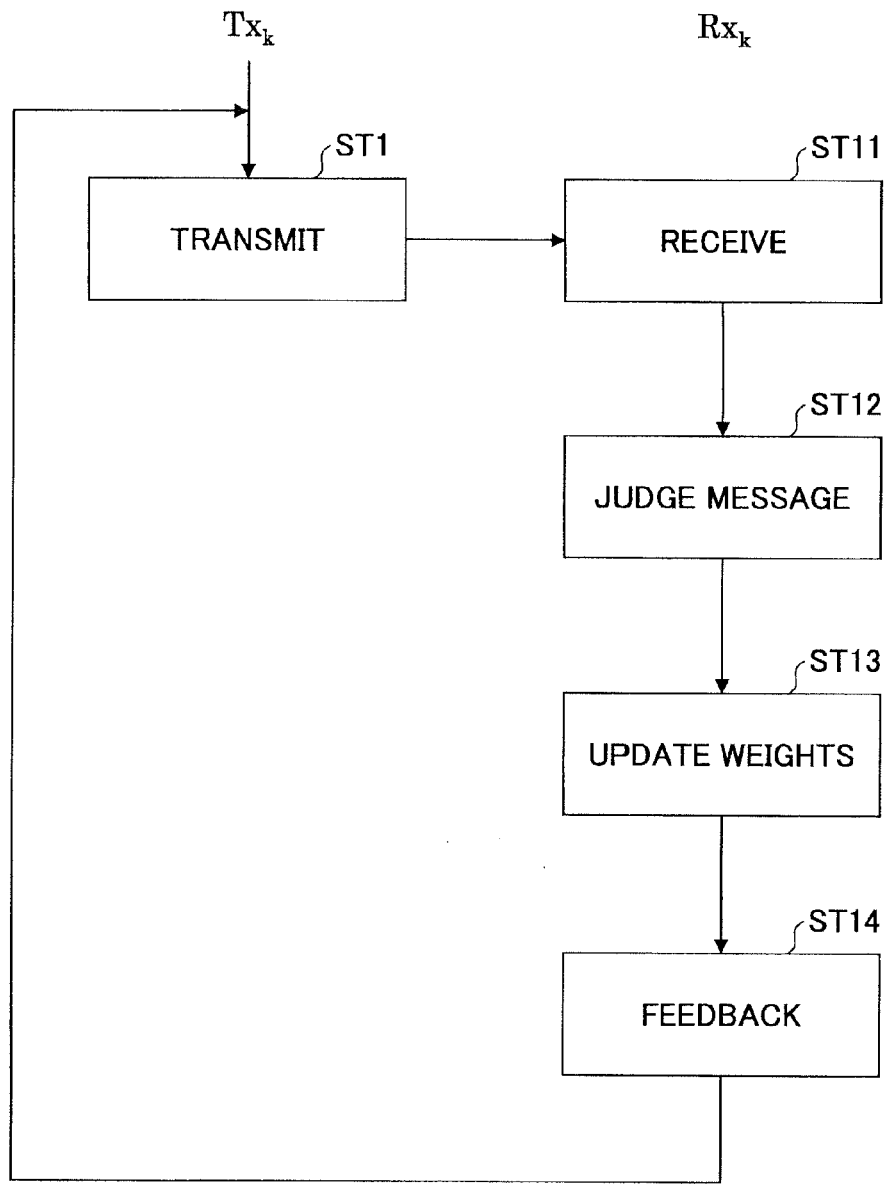
FIG. 7 is a flow chart for explaining an example of a wireless communication process.

FIG. 7 is a flow chart for explaining an example of the wireless communication process. In FIG. 7, a step ST1 may be executed by the transmitter $Tx_k$, for example, and steps ST11 through ST14 may be executed by the receiver $Rx_k$, for example.

Figure 8:
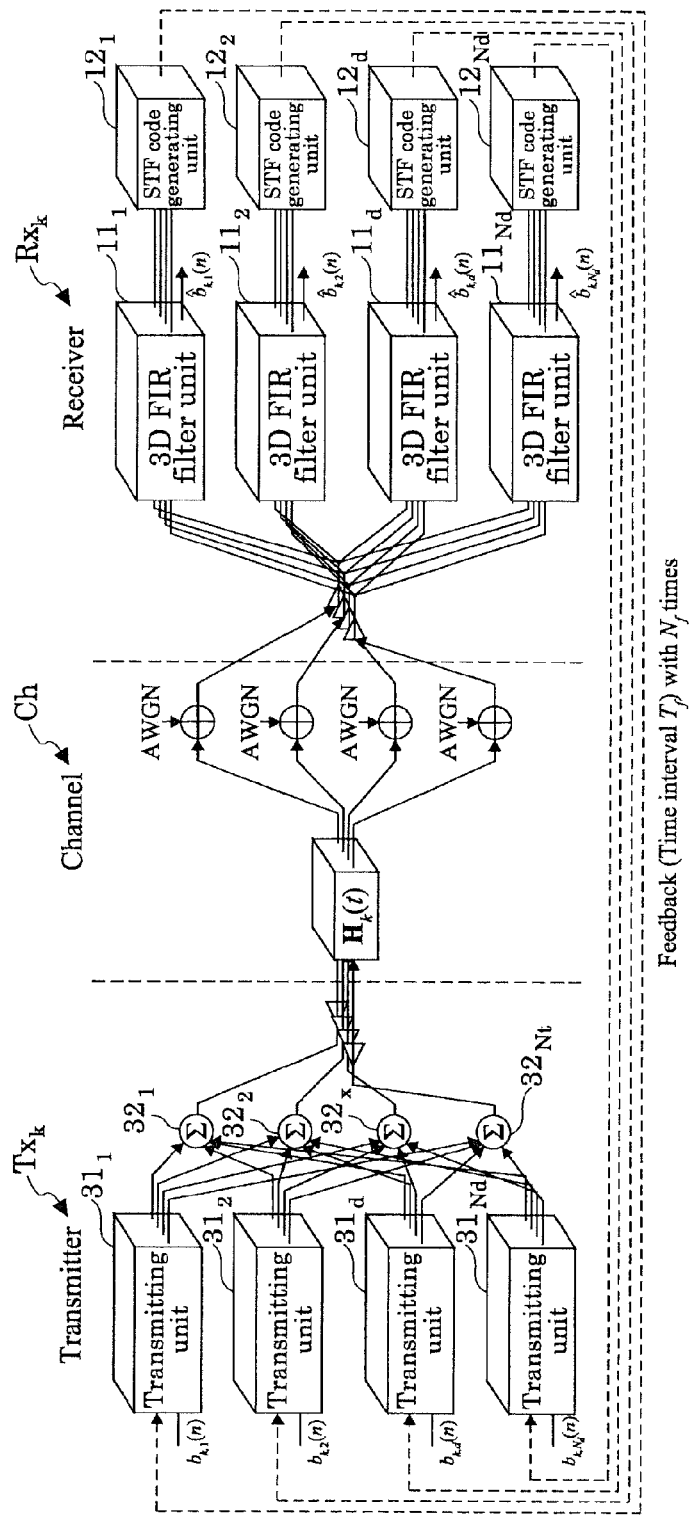
FIG. 8 is a functional block diagram illustrating an example of a transmitter and a receiver.

FIG. 8 is a functional block diagram illustrating an example of the transmitter $Tx_k$ and the receiver $Rx_k$ that may be used by the wireless communication process illustrated in FIG. 7, for example. The illustration of the antennas through which the feedback may be made from the receiver $Rx_k$, and the antennas through which the transmitter $Tx_k$ may receive the feedback is omitted in FIG. 8.

The transmitter $Tx_k$ illustrated in FIG. 8 may include a transmitting unit $31_i$ for the ith substream message symbol $b_{ki}(n)$, where $i=1, 2, \ldots, d, \ldots, N_d$, an adder unit $32_j$, where $j=1, 2, \ldots, x, \ldots, N_t$, and $N_t$ antennas. A channel Ch may be represented by the impulse response matrix $H_k(t)$ of the formula (5) described above and the AWGN (or $n_y(t)$), such that the received signal $r_y(t)$ of the yth antenna of the receiver $Rx_k$ may be given by the formula (7) described above. The receiver $Rx_k$ may include $N_r$ receiver antennas, a three-dimensional (3D) adaptive FIR filter unit $11_i$, and a STF code generating unit $12_i$, where $i=1, 2, \ldots, d, N_d$.

In FIG. 7, the step ST1 may use the matrix $P_{k,d,x}$, that is, the STF code represented by the formula (3), to generate and transmit the signal represented by the formula (4) from the xth antenna ($x=1, 2, \ldots, N_t$) of the transmitter $Tx_k$, using the transmitting unit $31_i$ and the adder unit $32_j$.

Figure 9:
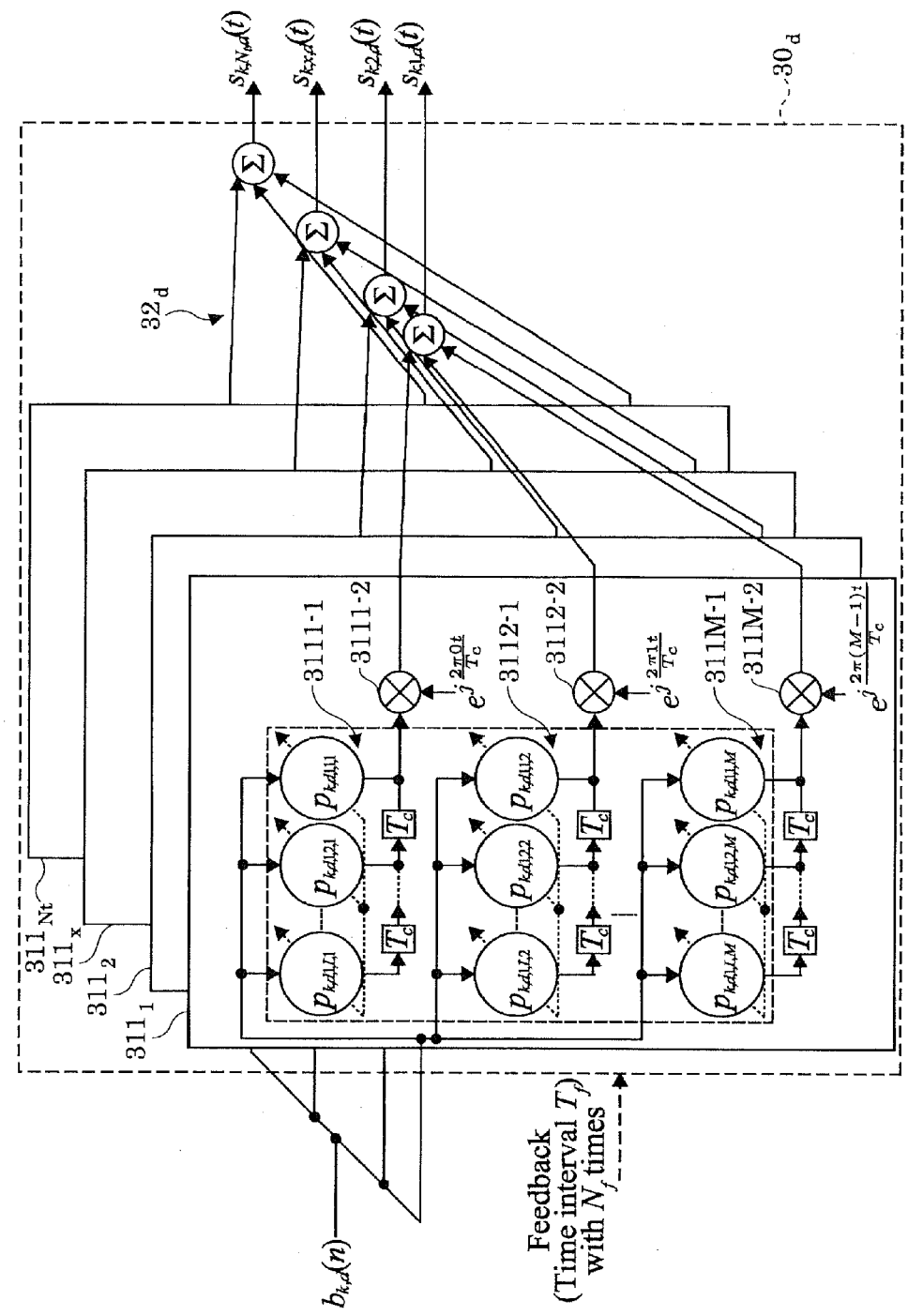
FIG. 9 is a functional block diagram illustrating the example of the transmitter in more detail.

FIG. 9 is a functional block diagram illustrating the example of the transmitter $Tx_k$ in more detail. FIG. 9 illustrates a transmitter part $30_d$ of the transmitter $Tx_k$ for the dth substream message symbol $b_{kd}(n)$. The transmitter part $30_d$ may include signature waveform generating units $311_1, 311_2, \ldots, 311_x, \ldots, 311_{Nt}$ that may be provided with respect to the first, second, ..., xth, ..., $N_t$th transmission antennas, and an adder unit $32_d$. Each of the signature waveform generating units $311_1, 311_2, \ldots, 311_x, \ldots, 311_{Nt}$ may receive the dth substream message symbol $b_{kd}(n)$, and the feedback from the corresponding STF code generating unit $12_d$ of the receiver $Rx_k$. The number of iterations of the feedback may be $N_f$, and the feedback time interval may be $T_f$. The adder unit $32_d$ may add M outputs of each of the signature waveform generating units $311_1, 311_2, \ldots, 311_x, \ldots, 311_{Nt}$, and output the signals $s_{k,1,d}(t) s_{k,2,d}(t), \ldots, S_{k,x,d}(t), \ldots, s_{k,Nt,d}(t)$ to be transmitted from the first, second, ..., xth, ..., $N_t$th antennas, respectively.

For example, the signature waveform generating unit $311_1$ may include M units $3111$-$1$ through $311M$-$1$, and M multipliers $3111$-$2$ through $311M$-$2$. Each unit $311i$-$1$ ($i=1, 2, \ldots, M$) may include L coefficient multipliers for multiplying $p_{k,d,l,L,i}, \ldots, p_{k,d,l,l,i}$, and delay units $T_c$ that may be connected as illustrated in FIG. 9. Each multiplier $311i$-$2$ may multiply an output of the unit $311i$-$1$ and $e^{j(2\pi\{1-1\})t/Tc}$. An output of the multiplier $311i$-$2$ may be supplied to a corresponding one of $N_t$ adders forming the adder unit $32_d$.

Returning now to the description of FIG. 7, the step ST11 may receive the signals transmitted from the transmitter $Tx_k$ through the first, second, ..., yth, ..., $N_r$th antennas, and generate the $(L+\alpha) \times M$ matrix $R_{k,y}(n)$ represented by the formula (10), whose elements, namely, the (l, m)th entry (i.e., lth chip and mth frequency component) $r_{k,y,l,m}(n)$, may be given by the formula (9). The step ST12 may judge the received message symbols from the $(L+\alpha) \times M$ matrix $R_{k,y}(n)$ represented by the formula (10), using the formulas (11) and (12). The step ST13 may update the weight matrix $W_{k,d,y}(n)$ of the three-dimensional adaptive FIR filter 11 according to the formula (13). The step ST14 may generate the updated STF code $P_{k,d,x}(\phi)$, whose elements $p_{k,d,x,l,m}(\phi)$ may be represented by the formula (16) based on the updated weight matrix $W_{k,d,y}(n)$ of the three-dimensional adaptive FIR filter 11, and feed back the updated STF code $P_{k,d,x}(\phi)$ to the transmitter $Tx_k$. The number of iterations of the feedback may be $N_f$, and the feedback time interval may be $T_f$. Hence, at the transmitter $Tx_k$, the step ST1 may use the updated STF code $P_{k,d,x}(\phi)$ that is fed back from the receiver $Rx_k$, in place of the STF code $P_{k,d,x}$ represented by the formula (3), in order to generate and transmit the signal represented by the formula (4) from the xth antenna ($x=1, 2, \ldots, N_t$) of the transmitter $Tx_k$. The processes of the steps ST1 through ST14 may be repeated in order to optimize the STF code used by the transmitter $Tx_k$ for the current channel state in order to generate and transmit the signal represented by the formula (4) from the xth antenna ($x=1, 2, \ldots, N_t$).

Figure 10:
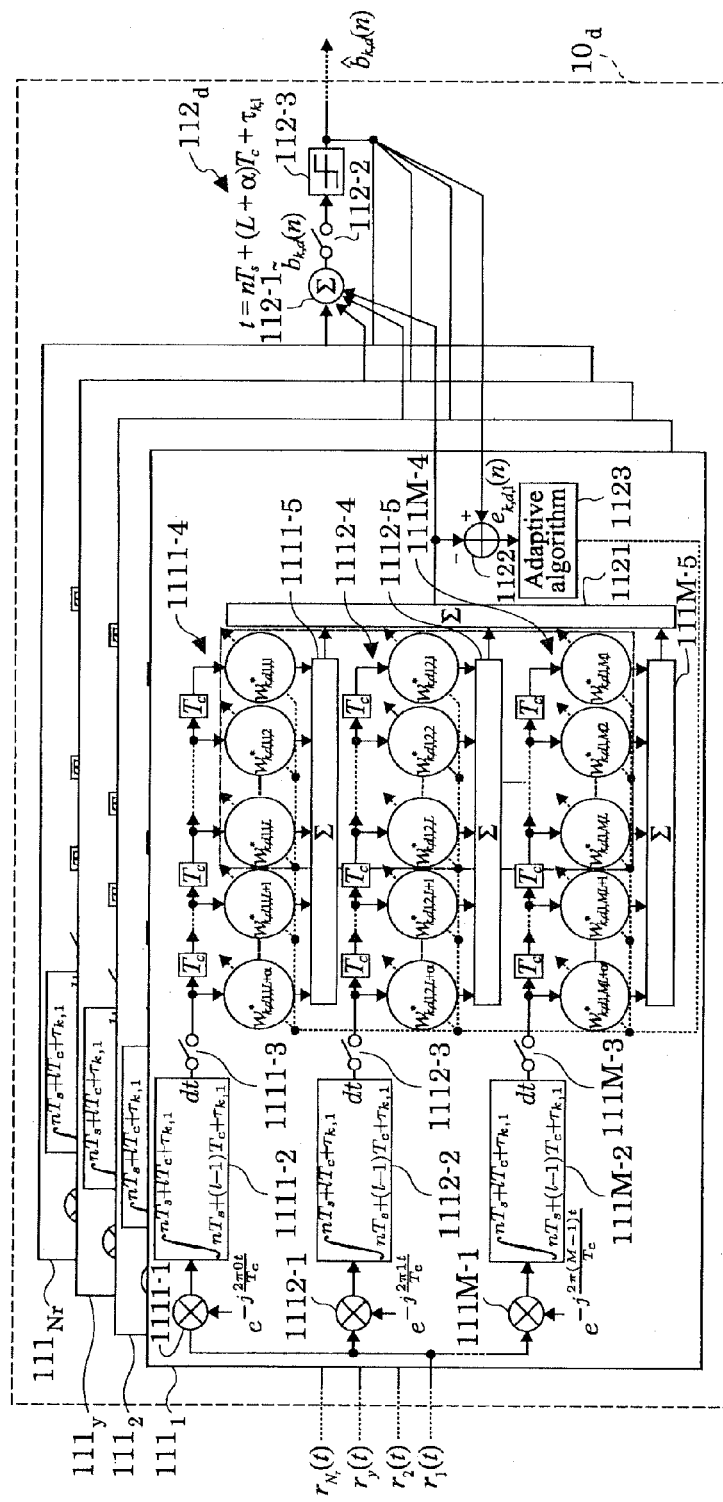
FIG. 10 is a functional block diagram illustrating the example of the receiver in more detail, all arranged in accordance with at least some embodiments of the present disclosure.

FIG. 10 is a functional block diagram illustrating the example of the receiver $Rx_k$ in more detail. FIG. 10 illustrates a receiver part $10_d$ of the receiver $Rx_k$ for the dth substream message symbol $b_{kd}(n)$. The receiver part $10_d$ may include three-dimensional (3D) adaptive FIR filter units $111_1, 111_2, \ldots, 111_y, \ldots, 111_{Nr}$ that may be provided with respect to the first, second, ..., yth, ..., $N_r$th receiver antennas, and a decoder unit $112_d$.

Each FIR filter unit $111_i$ may include a multiplier $111i$-$1$ ($i=1, 2, \ldots, M$) to multiply $e^{-j(2\pi(i-1)t/Tc}$ the received signal $r_i(t)$, a LPF (Low-Pass Filter) unit $111i$-$2$, a sampler $111i$-$3$, a tapped delay line unit $111i$-$4$, an adder $111i$-$5$, an adder $1121$, an adder $1122$, and an adaptive algorithm unit $1123$. Each unit $111i$-$4$ may include delay units $T_\alpha$, and $L+\alpha$ coefficient multipliers for multiplying $W^*_{k,d,l,i,L+\alpha}, \ldots, W^*_{k,d,l,i,l}$, that may be connected as illustrated in FIG. 10. The adder $1121$ may add outputs of the adders $1111$-$5$ through $111M$-$5$, and supply an output to the adder $1122$ and an adder $112$-$1$ of the decoder unit $112_d$. The adder $1122$ may add (in this example, subtract) the output of the adder $1121$ from an output $e_{k,d,i}(n)$ of a data decoder $112$-$3$ of the decoder unit $112_d$. An output of the adder $1122$ may be supplied to an adaptive algorithm unit $1123$ which may adaptively update the coefficients $W^*_{k,d,l,i,L++}, \ldots, W^*_{k,d,l,i,l}$, of the $L+\alpha$ coefficient multipliers of the corresponding unit $111i$-$4$.

The decoder unit $112_d$ may have a known structure including the adder $112$-$1$, a data detector (or data sampler) $112$-$2$, and the data decoder (or message symbol decoder) $112$-$3$. The receiver part $10_d$ may correspond to the FIR filter unit $11_d$ illustrated in FIG. 8.

Hence, the received signals $r_1(t), r_2(t), \ldots, r_y(t), \ldots, r_{Nr}(t)$ may be input to the FIR filter units $111_1, 111_2, \ldots, 111_y, \ldots, 111_{Nr}$, respectively. The decoder unit $112_d$ may generate the message symbol $\hat{b}_{k,d}(n)$ from outputs of the FIR filter units $111_1, 111_2, \ldots, 111_y, \ldots, 111_{Nr}$, and supply the message symbol $\hat{b}_{k,d}(n)$ to the corresponding STF code generator unit $12_d$ illustrated in FIG. 8.

The technique disclosed heretofore may be applied to a communication system in which both the transmitter and the receiver are fixed or, at least one of the transmitter and the receiver is fixed or, at least one of the transmitter and the receiver is movable. For example, both the transmitter and the receiver may be fixed when the transmitter and the receiver are base stations communicating with each other. In addition, at least one of the transmitter and the receiver may be fixed when the transmitter and the receiver respectively are a mobile communication apparatus and a base station, or vice versa, communicating with each other. Both the transmitter and the receiver may be movable when both the transmitter and the receiver are mobile communication apparatuses communicating with each other, although the mobile communication apparatuses may avoid frequent movements.

Furthermore, the technique disclosed heretofore may be applied to various communication systems adapted not only to the multi-stream transmission but also to the single-stream transmission.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/-communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the terms "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both term's. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A communication apparatus communicatable with an external transmitter by MIMO (Multi-Input Multi-Output) transmission, comprising:
a receiver configured to receive signals from the transmitter through a plurality of receiver antennas,
wherein the receiver comprises:
a filter configured to filter the signals received through the plurality of receiver antennas, and having a weight matrix thereof updated by an adaptive algorithm with respect to each substream message symbol from the transmitter; and
a code generator configured to feed back a part of the weight matrix updated by the filter, as an updated STF (Space-Time-Frequency) code, to the transmitter.

2. The communication apparatus as claimed in claim 1, wherein the receiver receives one of a multi-stream transmission and a single-stream transmission from the transmitter through the plurality of receiver antennas.

3. The communication apparatus as claimed in claim 2, wherein the receiver receives the signals from the transmitter by MIMO/CDMA (MIMO-Code Division Multiple Access) transmission.

4. The communication apparatus as claimed in claim 1, wherein a number of the plurality of receiver antennas is the same as or is different from a number of transmission antennas of the transmitter.

5. The communication apparatus as claimed in claim 1, wherein the filter includes a plurality of three-dimensional adaptive FIR filter units that are provided with respect to the plurality of receiver antennas, respectively.

6. A communication apparatus communicatable with an external receiver by MIMO (Multi-Input Multi-Output) transmission, comprising:
a transmitter configured to transmit signals to the receiver through a plurality of transmission antennas,
wherein the transmitter comprises:
a signature waveform generator configured to generate a signal based on a STF (Space-Time-Frequency) code for a substream message symbol to be transmitted from each of the plurality of transmission antennas, and update the STF code based on which the signal is generated to an updated STF code in response to a feedback from the receiver,
wherein the feedback includes a part of a weight matrix updated by a filter within the receiver with respect to each substream message symbol transmitted from the transmitter, as the updated STF code.

7. The communication apparatus as claimed in claim 6, wherein the transmitter transmits one of a multi-stream transmission and a single-stream transmission from the plurality of transmission antennas.

8. The communication apparatus as claimed in claim 7, wherein the transmitter transmits the signals by MIMO/CDMA (MIMO-Code Division Multiple Access) transmission.

9. The communication apparatus as claimed in claim 6, wherein a number of the plurality of transmission antennas is the same as or is different from a number of reception antennas of the receiver.

10. The communication apparatus as claimed in claim 6, wherein the signature waveform generator includes, with respect to one substream message symbol, a plurality of signature waveform generating units that are provided with respect to the plurality of transmission antennas, and an adder unit configured to output the signals to be transmitted from the plurality of transmission antennas based on outputs of the plurality of signature waveform generating units, wherein each of the plurality of signature waveform generating units receives the one substream message symbol and the feedback from the receiver corresponding to the one substream message symbol.

11. A communication system comprising:
at least one first communication apparatus; and
at least one second communication apparatus communicatable with the first communication apparatus by MIMO (Multi-Input Multi-Output) transmission,
wherein the first communication apparatus comprises a signature waveform generator configured to generate a signal based on a STF (Space-Time-Frequency) code for a substream message symbol to be transmitted from each of a plurality of transmission antennas, and update the STF code based on which the signal is generated to an updated STF code in response to a feedback from the second communication apparatus; and
wherein the second communication apparatus comprises:
a filter configured to filter signals received from the first communication apparatus through a plurality of receiver antennas, and having a weight matrix thereof updated by an adaptive algorithm with respect to each substream message symbol from the first communication apparatus; and
a code generator configured to provide the feedback to the first communication apparatus by feeding back a part of the weight matrix updated by the filter, as the updated STF code.

12. The communication system as claimed in claim 11, wherein one of a multi-stream transmission and a single-stream transmission is made from the first communication apparatus to the second communication apparatus through the plurality of transmission antennas of the first communication apparatus and the plurality of receiver antennas of the second communication apparatus.

13. The communication system as claimed in claim 12, wherein the first communication apparatus and the second communication apparatus communicate by MIMO/CDMA (MIMO-Code Division Multiple Access) transmission.

14. The communication system as claimed in claim 11, wherein a number of the plurality of transmission antennas of the first communication apparatus is the same as or is different from a number of the plurality of receiver antennas of the second communication apparatus.

15. A communication method to perform a communication between a first communication apparatus and a second communication apparatus by MIMO (Multi-Input Multi-Output) transmission, comprising:
generating, in the first communication apparatus, a signal based on a STF (Space-Time-Frequency) code for a substream message symbol to be transmitted from each of a plurality of transmission antennas, and updating the STF code based on which the signal is generated to an updated STF code in response to a feedback from the second communication apparatus;

filtering, in the second communication apparatus, signals received from the first communication apparatus through a plurality of receiver antennas by a filter having a weight matrix thereof updated by an adaptive algorithm with respect to each substream message symbol from the first communication apparatus; and providing, in the second communication apparatus, the feedback to the first communication apparatus by feeding back a part of the weight matrix updated by the filter, as the updated STF code.

16. The communication method as claimed in claim 15, wherein one of a multi-stream transmission and a single-stream transmission is made from the first communication apparatus to the second communication apparatus through the plurality of transmission antennas of the first communication apparatus and the plurality of receiver antennas of the second communication apparatus.

17. The communication method as claimed in claim 16, wherein the first communication apparatus and the second communication apparatus communicate by MIMO/CDMA (MIMO-Code Division Multiple Access) transmission.

18. The communication method as claimed in claim 15, wherein a number of the plurality of transmission antennas of the first communication apparatus is the same as or is different from a number of the plurality of receiver antennas of the second communication apparatus.

19. A non-transitory computer-readable storage medium that stores a program which, when executed by a computer of a receiver, causes the computer to perform a wireless communication process comprising:

a filtering procedure causing the computer to filter signals received from a transmitter through a plurality of receiver antennas by a filter, and update a weight matrix by an adaptive algorithm with respect to each substream message symbol from the transmitter; and a generating procedure causing the computer to feed back a part of the weight matrix updated by the filtering procedure, as an updated STF (Space-Time-Frequency) code, to the transmitter.

20. The non-transitory computer-readable storage medium as claimed in claim 19, wherein the wireless communication process further comprises:

a receiving procedure causing the computer to receive one of a multi-stream transmission and a single-stream transmission from the transmitter through the plurality of receiver antennas by MIMO/CDMA (MIMO-Code Division Multiple Access) transmission.

* * * * *

UNITED STATES PATENT AND TRADEMARK OFFICE
CERTIFICATE OF CORRECTION

PATENT NO. : 8,565,209 B2
APPLICATION NO. : 13/321936
DATED : October 22, 2013
INVENTOR(S) : Hamamura It is certified that error appears in the above-identified patent and that said Letters Patent is hereby corrected as shown below:

On Title Page 2, in Item (56), under "OTHER PUBLICATIONS", in Column 1, Line 36, delete "at al.," and insert -- et al., --, therefor.

On Title Page 2, in Item (56), under "OTHER PUBLICATIONS", in Column 2, Line 69, delete "Bauml," and insert -- Bäuml, --, therefor.

In the Specification:

In Column 7, Line 17, delete " $\hat{n}^{\varphi} \lfloor(\phi T_f + \Delta_k + \alpha T_c + \tau_{k,v,x,l})/T_x\rfloor, \lfloor \cdot \rfloor$ " and insert -- $\hat{n} \triangleq \lfloor(\varphi T_f + \Delta_k + \alpha T_c + \tau_{k,y,x,1})/T_s\rfloor, \lfloor \cdot \rfloor$ --, therefor.

In Column 8, Line 30, delete "(Nm<min(N$_t$, N$_r$)." and insert -- (Nm<min(N$_t$, N$_r$)). --, therefor.

In Column 11, Line 67, delete " $e^{j(2n\{1-1\})t/Tc}\cdot$ " and insert -- $e^{j\{2n(i-1)\}t/Tc}$ --, therefor.

In Column 12, Line 44, delete "T$_\alpha$," and insert -- T$_c$, --, therefor.

In Column 12, Line 54, delete " $W^*_{k,d,l,i,L++}, \ldots, W^*_{k,d,l,i,P}$ " and insert -- $W^*_{k,d,1,i,L+\alpha}, \ldots, W^*_{k,d,1,i,1}$ --, therefor.

Signed and Sealed this
Thirteenth Day of May, 2014

Michelle K. Lee
*Deputy Director of the United States Patent and Trademark Office*

In Column 14, Line 24, delete "terms" and insert -- term --, therefor.

In Column 15, Line 1, delete "term's." and insert -- terms. --, therefor.